United States Patent [19]

Hinzpeter et al.

[11] Patent Number: 5,004,576

[45] Date of Patent: Apr. 2, 1991

[54] PROCESS AND APPARATUS FOR MONITORING PRESSING FORCES IN A TABLET PRESS

[75] Inventors: Juergen Hinzpeter, Schwarzenbek; Hans-Dieter Gruedelbach, Moelln, both of Fed. Rep. of Germany

[73] Assignee: Wilhelm Fette GmbH, Schwarzenbek, Fed. Rep. of Germany

[21] Appl. No.: 347,335

[22] Filed: May 3, 1989

[30] Foreign Application Priority Data

Jul. 11, 1988 [DE] Fed. Rep. of Germany ....... 3823417

[51] Int. Cl.$^5$ ............................................. B29C 43/02

[52] U.S. Cl. .................................. 264/40.5; 264/109; 425/136; 425/149

[58] Field of Search ..................... 264/40.1, 40.5, 109, 264/40.4; 425/136, 149, 345, 353

[56] References Cited

U.S. PATENT DOCUMENTS

| | | | |
|---|---|---|---|
| 3,255,716 | 6/1966 | Knoechel et al. | 264/40.4 |
| 4,030,868 | 6/1977 | Williams | 425/149 |
| 4,062,914 | 12/1977 | Hinzpeter | 264/40.1 |
| 4,100,598 | 7/1978 | Stiel et al. | 364/476 |
| 4,121,289 | 10/1978 | Stiel et al. | 364/522 |
| 4,238,431 | 12/1980 | Stuben et al. | 264/40.5 |
| 4,570,229 | 2/1986 | Breen et al. | 364/476 |
| 4,680,158 | 7/1987 | Hinzpeter et al. | 264/40.5 |

*Primary Examiner*—Mary Lynn Theisen

*Attorney, Agent, or Firm*—Michael J. Striker

[57] ABSTRACT

To monitor the pressing forces of an upper and lower piston of a tablet press which cooperate as a piston pair, in the currently-known process an average value formed from successive pressing force measurement results is compared with two adjustable tolerance bounds and that average value is correlated with two adjustable individual value limits which follow the course of this average value or are fixed. Maxima of individual pressing force measurements are compared with these individual value limits. To detect certain operational difficulties involving slight damage to an individual piston while avoiding tolerance ranges which are so narrow that frequent stopping of the press occurs piston pair average value limits, with which the piston pair average value of the pressing force is compared, are associated with the individual piston pairs. These piston pair average values are stored in a controlling computer which can stop the tablet press and indicate a faulty piston.

8 Claims, 3 Drawing Sheets

PROCESS AND APPARATUS FOR MONITORING PRESSING FORCES IN A TABLET PRESS

BACKGROUND OF THE INVENTION

Our invention relates to a process and apparatus for observing or monitoring pressing forces in a tablet press and, more particularly, for monitoring the pressing forces due to upper and lower pistons of a tablet press acting pairwise.

In the known process for monitoring pressing forces of upper and lower pistons of a tablet press acting pairwise in a piston pair, an average value is formed from successive measurement results of the pressing force and is compared with two adjustable tolerance bounds. The average value so formed is correlated with two adjustable individual value limits which follow the course of the average value or are fixed, with which maxima of the pressing force measurement results are compared.

Tablet presses are used for making tablets, which have upper and lower pistons in pairs, which press the powdered material in matrices for making tablets. Thus operating problems of different types can occur. These problems can include piston breaking. Also they can be due to differing piston lengths or partial slight ruptures on the piston head surfaces or also because of dirt. Metering fluctuations occur in operation which are caused by nonuniformities in the nature of the material being processed.

To detect resulting variations in the final product tablet promptly, tablet presses generally are provided with a pressing force monitoring apparatus. One such apparatus has standard strain measuring gauges, which are mounted on supports of the plattens for the pistons. Thus the conditions allowing different pressing forces result in different strains and stresses on the platten support which are converted into a proportional voltage signal.

For detection of errors an average value A is formed with a known device from successive measurement values, whose course is followed within two adjustable fixed tolerance bounds, G. As soon as the average value A exceeds or does not fall within these tolerance bounds G the tablet press is stopped. All causes for operational problems may not be detected in time or promptly with such a device however since a slight damage to an individual piston of the machine does not substantially change the average value in a machine with a plurality of pistons. Moreover with such a device a piston break already present in a machine in operation can not be established, since such a fault is not subsequently clearly detectable in a clear shift of the average value. Besides in this type of device the tolerance limits must be selected comparatively far apart to prevent the tablet press being frequently stopped without any problems present. That is because among other things the pressing force of the individual piston pairs differs in its size because of the manufacturing tolerances in the length of the piston so that accordingly the individual values from which the average value is formed fluctuate. A comparatively large separation of the tolerances from each other leads however to detection of only comparatively large deviations of the individual values of the pressing force from the average values and particularly to accompanying operation problems.

To provide a known device (German Patent 25 20 662) to correct that, two adjustable individual value limits B and C are correlated with the average value A and follow its course. The maxima of the individual values of the pressing forces are compared to these individual value limits B and C. This has the advantage that fluctuations of the average value within an adjustable tolerance range between the limits G, which are independent of a second tolerance range defined by the limits B and C for the variations of the maxima of the individual values of the pressing forces, can be included. Thus a comparatively narrow tolerance range can be chosen, because the fluctuations of the average value have no influence on the tolerance range given by the limits B and C for the variations of the maxima of the individual values of the pressing forces on the average value A.

Although piston breaks are detectable with this known process without further features or efforts because of the occurring fluctuations in the pressing forces, however minimal changes in the pressing force of an individual piston pair, which are due to ruptures on the piston head surfaces or to buckling or adhering and/or dirt on the piston head surfaces, are not, because piston faults of this kind have less effect on pressing force fluctuations than unavoidable metering fluctuations or platten force variations which mask such piston faults.

On the other hand buckling of the ram, partial rupture on the tool and adhering residues have an undesirable influence on the piston head surfaces on the strength, the decomposition rate and on the shape of the tablets. Advantageously it is therefore desirable to detect faults of this kind in the automatic manufacture of tablets and to be able to halt production automatically.

SUMMARY OF THE INVENTION

Accordingly, it is an object of our invention to provide a process and apparatus by which small faults on the pistons of the tablet press during manufacture of tablets are detected.

In keeping with these objects and with others which will become apparent hereinafter, piston pair average value limits, with which the piston pair average value of the pressing force is compared, are associated with individual piston pairs. Thus the variation of pressing force average value because of unavoidable differences in piston length in the individual piston pair are taken into consideration. Because of the additional comparison of the average values associated with the individual piston pairs with piston pair average value limits, other variations at the individual mold tools because of dirt on the piston head surfaces may be detected, since the piston pair average value which results from these faults lies outside the chosen limits.

The average values associated with the individual piston pairs can be formed one after the other or by a sliding average. By "sliding" we mean that in taking the average the oldest pressing force value determined is eliminated when each new pressing force value is obtained and the new value is used in the average. The average values are formed from a large number of tablet pressing forces measured at the piston pair concerned. This number is large enough to guarantee a sufficient statistical reliability but small enough so that there is a sufficiently fast reaction when a significant variation occurs. It has generally proved sufficient when the average value is ascertained from ten successive individual pressing force measurements at a piston pair.

Then on measurement of the eleventh value the first value of the pressing force is cancelled. After that on measurement of the twelfth value of the individual pressing force the second value in the average is cancelled or erased so that ten measured values are continuously used for the "sliding" average.

These piston pair measured average values for the individual piston pairs are compared with the associated limits. The press can then be stopped when the upper limit is exceeded or the lower limit has not been reached so that the piston pair which has the fault present is indicated.

Since the size of the piston pair average value suited to the appropriate piston pair is dependent on the specific length of the piston of this piston pair it is advantageous as far as an exchange of pistons goes that the piston pair average value is near the curve which produces the set or desired pressing force.

BRIEF DESCRIPTION OF THE DRAWING

The objects, features and advantages of my invention will be made more apparent from the following detailed description, reference being made to the accompanying drawing in which.

DETAILED DESCRIPTION OF THE INVENTION

Figure 1:
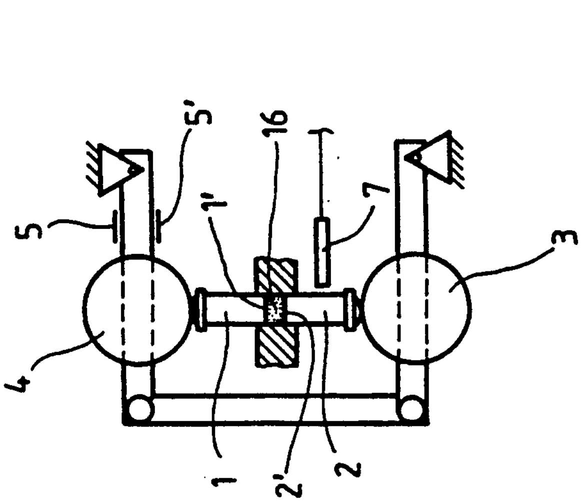
FIG. 1 is a cross sectional view through a tablet press with a ram, press platten and matrix containing the apparatus according to our invention.

The tablet press illustrated in FIG. 1 has a rotary matrix disk with a plurality of matrix passages 16, each of which is associated with a pair of pistons, i.e. an upper piston 1 and a lower piston 2. In pressing a tablet these pistons 1 and 2 with the piston head surfaces 1' and 2' are pressed by the plattens 3 and 4 into the matrix. The plattens 3 and 4 are held by supports which are provided with wire strain gauges 5 and 5'. The bending of the supports and thus the pressing force of the pistons 1 and 2 may be measured with these wire strain gauges 5 and 5' and the pressing force is transformed into voltage signals which are proportional to the size of the pressing force.

Figure 2:
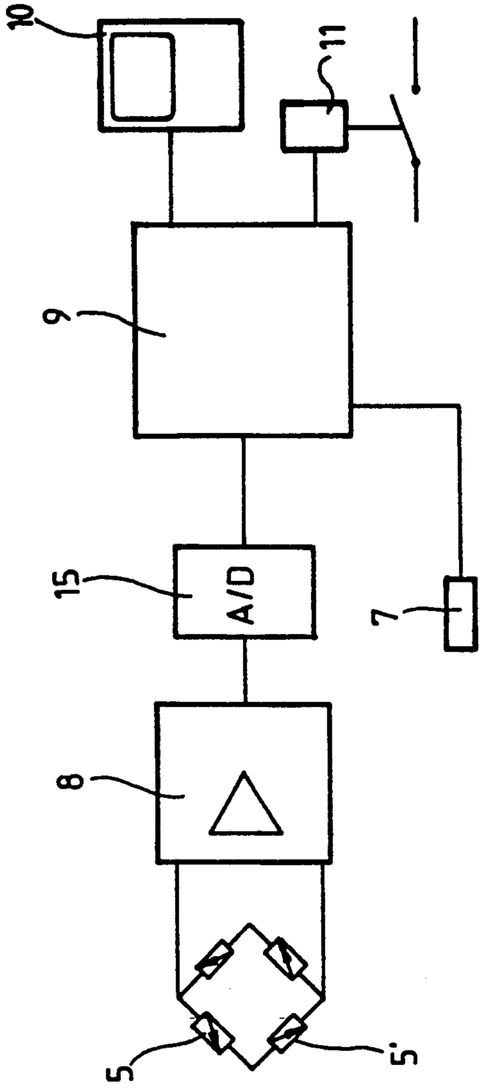
FIG. 2 is a circuit diagram for the apparatus for monitoring the pressing forces according to our invention.

The wire strain gauges 5 and 5' are connected according to the principle of a Wheatstone bridge as shown in FIG. 2. Thus the voltage change, which occurs on applying pressure to the wire strain gauges, is amplified by an amplifier 8. These signals are fed to an analog-digital converter 15, to which a computer 9 with a monitor 10 is connected.

A proximity switch 7 is part of a mechanism, which feeds a signal to the computer 9 on running a pair of pistons 1, 2 between the plattens 3 and 4. Moreover a relay 11 is provided, by which the tablet press is stopped, when a determined piston pair average value falls outside the limits associated with it.

Figure 3:
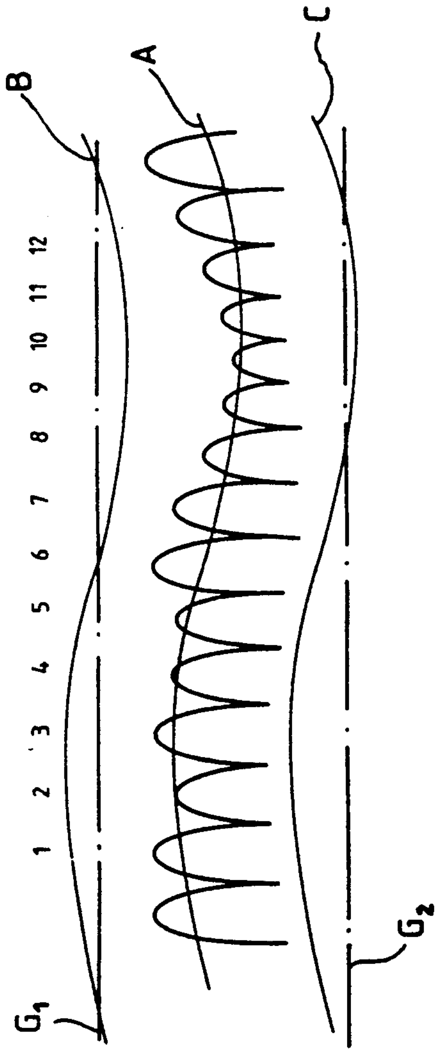
FIG. 3 is a graphical illustration of the pressing force values with their tolerance bounds.

In a known way from the individual successive measurement results for the pressing force according to FIG. 3 an average value corresponding to the curve A is formed. This average value A may be compared with two adjustable fixed tolerance bounds $G_1$ and $G_2$. Moreover two independently adjustable individual bounds B and C which follow the course of the average value curve A may be adjusted to the average value A. With these individual value limits the measured maximum individual values of the pressing force of the individual pair of pistons and thus their difference may be compared to the measured average value A.

Should the average value A exceed or drop below the bounds $G_1$ or $G_2$ or should a maximum individual value of the pressing force exceed or drop below the upper or lower individual limits corresponding to curves B or C, the machine or tablet press is put out of operation, i.e. it is stopped.

When the piston stations are numbered continuously from 1 to 43, with this arrangement for example a break of piston 1 or 2 can be indicated on the monitor screen 10 which provides a means for indicating a fault on the individual pistons. To detect slight disturbing effects which impair operation, piston pair average value S is correlated with the individual piston pair 1, 2, which are compared with a lower and an upper piston pair average value limit $S_u$ and/or $S_o$.

Figure 4:
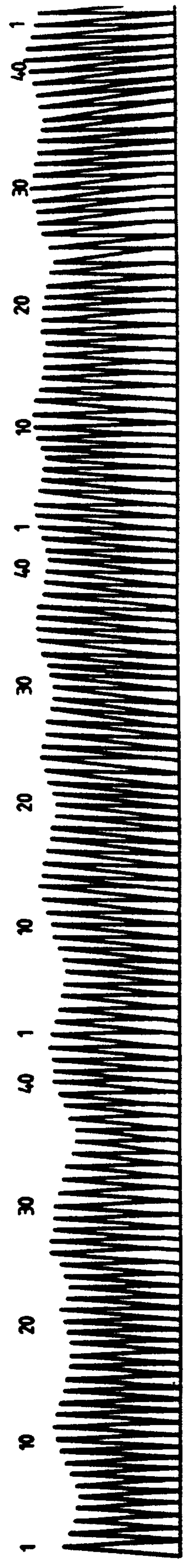
FIG. 4 is a graphical illustration of the pressing force after three cycles of the matrix disk.

In FIG. 4 graphical illustration is produced using the individual pressing forces, which were measured at the individual piston pairs 1 to 43 on three cycles of a matrix disk. Moreover the pressing forces on the individual piston pairs 1 to 43 are of different size which can be traced back to different piston lengths.

Figure 5:
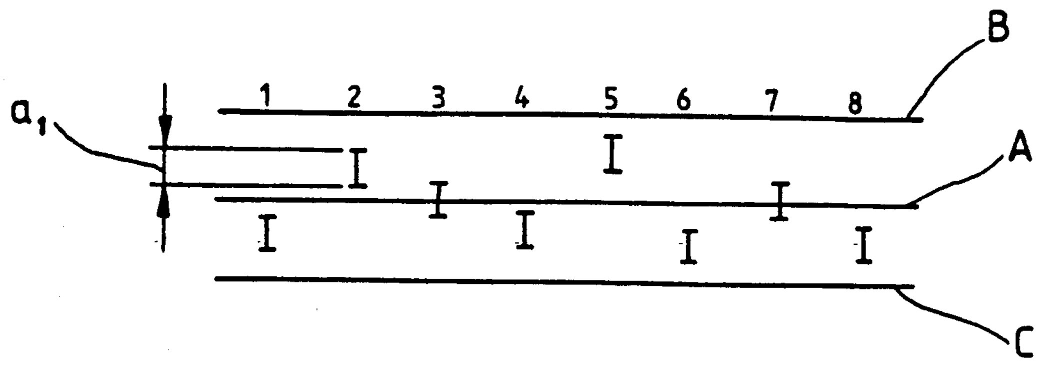
FIG. 5 is a diagram showing the scatter of the pressing force measurement results for successive piston pairs.
Figure 6:
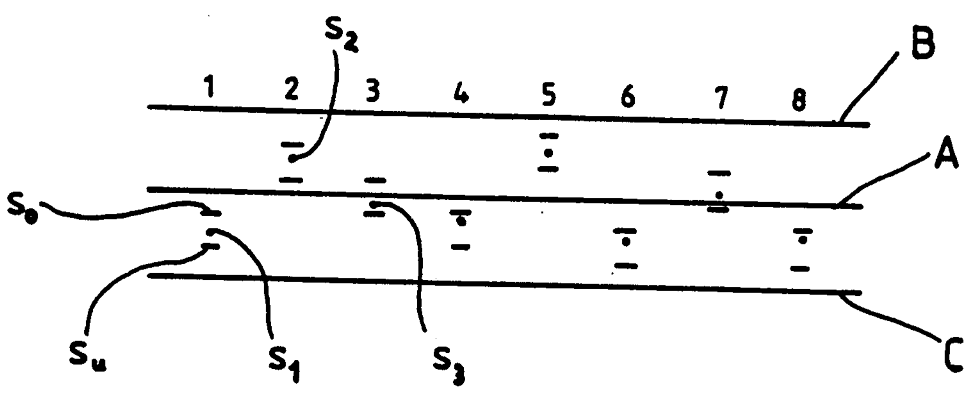
FIG. 6 is a diagram showing the average values of the pressing force for individual pairs of pistons associated with the average value limits.

For formation of a piston pair average value, which is associated with a certain piston pair, for example the piston pair 30, the measured value is formed from the pressing force measurements of this pair from ten cycles of the matrix disk. After that this piston pair average value is obtained by using a continuously sliding "window" method of averaging, i.e. by taking a new value and dropping the oldest value used to form the average as the measurement process moves forward in time. The piston pair average value according to FIGS. 5 and 6 is compared with the upper and lower bounds $S_o$ and $S_u$. These bounds according to FIG. 6 are spaced further from each other than the scatter of the pressing forces of the individual piston in the value al according to FIG. 5 so that, after leaving the scatter range, a halt of the machine occurs.

Since the differences of piston pair average values S, e.g. $S_1$ and $S_2$, from the predetermined pressing force curve A is substantially dependent on the differences in piston lengths, an approach of the average value corresponding to the average value $S_3$ to the predetermined pressing force curve A may be attained by replacement of some of the pistons of a certain length which are associated with larger deviations. It is of particular advantage however that small operational disturbances such as dirt on the piston head surfaces 1' or 2' or slight tears or breaks on the piston head surfaces 1' or 2' are immediately detectable when the piston pair average value S is outside the average value $S_o$ or $S_u$.

In the embodiment described above the means for shutting off the tablet press comprises the relay 11 connected to the computer 10.

It will be understood that each of the elements of our invention described above, or two or more together, may also find a useful application in other types of inventions differing from the types described above.

While the invention has been illustrated and described as embodied in a process and apparatus for monitoring the pressing force in a tablet press, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of this invention.

What is claimed as new and desired to be protected by Letters Patent is set forth in the appended claims.

1. In a process for monitoring a pressing force acting successively and periodically on each of a plurality of piston pairs of a tablet press in succession, each of said piston pairs consisting of an upper and lower piston acting pairwise in said piston pair, in which an average value of said pressing force formed from a plurality of successive measurement results of said pressing force is compared with two adjustable tolerance bounds for said average value, said average value of said pressing force being further correlated with two adjustable individual value limits which follow the course of said average value or are fixed, maxima of said pressing force on said individual ones of said piston pairs being compared with said adjustable individual value limits, the improvement wherein a piston pair average value of said pressing force is associated with individual ones of said piston pairs, said piston pair average values for each individual one of said piston pairs being formed from the measurement results of said pressing force for said each individual one of said piston pairs over a predetermined number of cycles of said tablet press, piston pair average value limits are associated with said individual ones of said piston pairs, said piston pair average value of said pressing force is compared with said piston pair average value limits for said individual ones of said piston pairs and said piston pair is indicated, when said piston pair average value exceeds said piston pair average value limits so that said press may be stopped and said piston pair examined.

2. The improvement defined in claim 1 wherein said piston pair average value is sliding.

3. The improvement defined in claim 1, further comprising feeding individual ones of the measurement results of said pressing force for each of said piston pair to an analog/digital converter connected to a computer and controlling said computer to form said piston pair average values of said pressing force.

4. An apparatus for performing a process for monitoring a pressing force successively and periodically on each of a plurality of piston pairs of a tablet press in succession, each of said piston pairs consisting of an upper and lower piston acting pairwise in said piston pair, in which an average value of said pressing force formed from successive measurement results of said pressing force is compared with two adjustable tolerance bounds for said average value, said average value of said pressing force being further correlated with two adjustable individual value limits which follow the course of said average value or are fixed, maxima of said pressing force on said individual ones of said piston pairs being compared with said adjustable individual value limits, a piston pair average value of said pressing force being formed for each one of said piston pairs as an average of the measurement results of said pressing force on said each one of piston pairs over a predetermined number of cycles of the tablet press and piston pair average value limits, with which said piston pair average value of said pressing force is compared, being formed and associated with each of said piston pairs, said tablet press being halted when said piston pair average value exceeds said piston pair average value limits; said apparatus comprising a computer in which said piston pair average values limits are stored and associated with said piston pairs and in which said piston pair average values are compared with said piston pair average value limits.

5. An apparatus according to claim 4 wherein said computer is structured so that said piston pair average value limits are adjustable.

6. An apparatus according to claim 4 further comprising an analog/digital converter.

7. An apparatus according to claim 4 further comprising means for halting said tablet press when said piston pair average value of said pressing force is not within said piston pair average value limits and means for indicating a malfunctioning one of said piston pairs.

8. A process for monitoring of a pressing force acting successively and periodically on each of a plurality of piston pairs of a tablet press, each of said piston pairs of said tablet press consisting of an upper and lower piston acting pairwise in said piston pair and for controlling said tablet press, comprising:

a. forming a pressing force average value from successive measurement results of said pressing force;
b. comparing said average value of said pressing force with two adjustable tolerance bounds for said average value to control said tablet press;
c. forming two adjustable individual value limits for said average value of said pressing force which follow the course of said average value of said pressing force or are fixed;
d. comparing maxima of said pressing force on each of said piston pairs with said individual value limits;
e. stopping said tablet press when said average value of said pressing force falls outside said tolerance bounds;
f. stopping said tablet press when said maxima of said pressing force falls outside of said individual value limits;
g. forming sliding piston pair average values of pressing force for each of said individual ones of said piston pairs for a predetermined number of cycles of said tablet press;
h. forming piston pair average value limits for each of said individual ones of said piston pairs;
i. comparing said piston pair average values of said pressing force with said piston pair average value limits for each of said piston pairs; and
j. stopping said tablet press when one of said piston pair average values falls outside of said piston pair average value limits for its corresponding piston pair.

* * * * *